(12) United States Patent
Golla et al.

(10) Patent No.: US 7,106,210 B2
(45) Date of Patent: Sep. 12, 2006

(54) METHOD AND APPARATUS FOR MUD PULSE TELEMETRY

(75) Inventors: Christopher A. Golla, Kingwood, TX (US); Laban M. Marsh, Houston, TX (US); Paul F. Rodney, Spring, TX (US); Cili Sun, Sugar Land, TX (US); Bipin K. Pillai, Tomball, TX (US); Paul D. Beene, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/105,754

(22) Filed: Apr. 14, 2005

(65) Prior Publication Data

US 2005/0179560 A1    Aug. 18, 2005

Related U.S. Application Data

(62) Division of application No. 10/619,197, filed on Jul. 14, 2003.

(51) Int. Cl.
*G81U 3/00* (2006.01)

(52) U.S. Cl. .................. 340/855.3; 702/6; 702/127; 702/189; 370/300; 340/870.05

(58) Field of Classification Search ............. 340/855.3, 340/870.05; 370/300; 455/67.11; 702/6, 702/127, 189
See application file for complete search history.

(56) References Cited

U.S. PATENT DOCUMENTS

| 5,323,385 | A | * | 6/1994 | Jurewicz et al. ............. 370/300 |
| 5,838,750 | A | * | 11/1998 | Rynaski et al. ............. 375/377 |
| 5,872,991 | A | * | 2/1999 | Okamoto et al. ............. 712/26 |
| 6,405,136 | B1 | | 6/2002 | Li et al. |
| 6,552,962 | B1 | | 4/2003 | Varsamis et al. |
| 6,564,883 | B1 | | 5/2003 | Fredericks et al. |
| 6,580,751 | B1 | | 6/2003 | Gardner et al. |

* cited by examiner

*Primary Examiner*—Albert K. Wong
(74) *Attorney, Agent, or Firm*—Mark E. Scott; Conley Rose, P.C.

(57) ABSTRACT

A method and related apparatus for telemetry between downhole devices and surface devices. In particular, the methods and related apparatus may send a first datum of a first parameter in an uncompressed form, and send a second datum of the first parameter in compressed form.

5 Claims, 3 Drawing Sheets

METHOD AND APPARATUS FOR MUD PULSE TELEMETRY

CROSS-REFERENCE TO RELATED APPLICATIONS

This application is a Divisional Application of application Ser. No. 10/619,197 filed Jul. 14, 2003, entitled "Method and Apparatus for Mud Pulse Telemetry".

STATEMENT REGARDING FEDERALLY SPONSORED RESEARCH OR DEVELOPMENT

Not applicable.

BACKGROUND OF THE INVENTION

1. Field of the Invention

Embodiments of the invention are directed to mud pulse telemetry in drilling operations. More particularly, embodiments of the invention are directed to data compression techniques for mud pulse telemetry in drilling operations.

2. Background of the Invention

In measuring-while-drilling (MWD) and logging-while-drilling (LWD) operations, information regarding the borehole and surrounding formation are gathered during the drilling process. Information gathered may not be needed at the surface immediately, but that information may be required before the tool returns to the surface. For information such as this, U.S. Pat. No. 5,774,420 may describe a system whereby stored data (also known as historical data) may be sent from downhole devices to the surface at the request of the surface equipment. Retrieval of the historical information may take place during times when drilling is temporarily paused, such as when the borehole is being conditioned (e.g. by the continuous flow of drilling fluid), or when the tool becomes stuck in the borehole. Transmission of historical information from downhole to the surface may take several hours using known techniques.

Other information gathered downhole may be needed at the surface as soon as the information is acquired. A limiting factor in sending data from downhole devices to the surface (or for that matter from the surface to downhole devices) is the speed at which the information may be transmitted within the mud column. Where the acquisition rate by the downhole device is greater than the transmission rate, some of the information gathered downhole may not be sent to the surface. In cases such as this, it may be that only every other or every third reading of the "real time" parameter may be sent to the surface.

Thus, what is needed in the art is a mechanism to speed the effective transmission rate of information in a mud pulse telemetry system.

BRIEF SUMMARY OF SOME OF THE EMBODIMENTS

The problems noted above are solved in large part by a method and related system for mud pulse telemetry. More particularly, the method may comprise sending a datum of information of a first parameter in an uncompressed form, and sending a second datum of information of the first parameter in a compressed form. In at least some embodiments, the compressed form of the datum may be a Delta value, possibly meaning that the compressed information sent is a difference between a previously transmitted datum and the information of the current datum.

Similarly, embodiments of the invention may comprise a drill string assembly having a downhole tool designed to generate data, and a communication system coupled to the downhole tool, where the communication system may be adapted to send a first datum in an uncompressed form to a surface device, and also send a second datum in a compressed form to the surface device. In at least some embodiments, the compressed datum may take the form of a Delta value based directly or indirectly on the uncompressed datum.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

The various embodiments of the present invention were developed in the context of hydrocarbon drilling operations sending information from downhole devices to the surface through mud pulse telemetry techniques. Because of the developmental context, this specification explains the concepts in terms of data transmission from downhole devices to the surface; however, this patent should not be construed as limited only to the precise developmental context, as the systems and methods may be useful in other applications.

Figure 1:
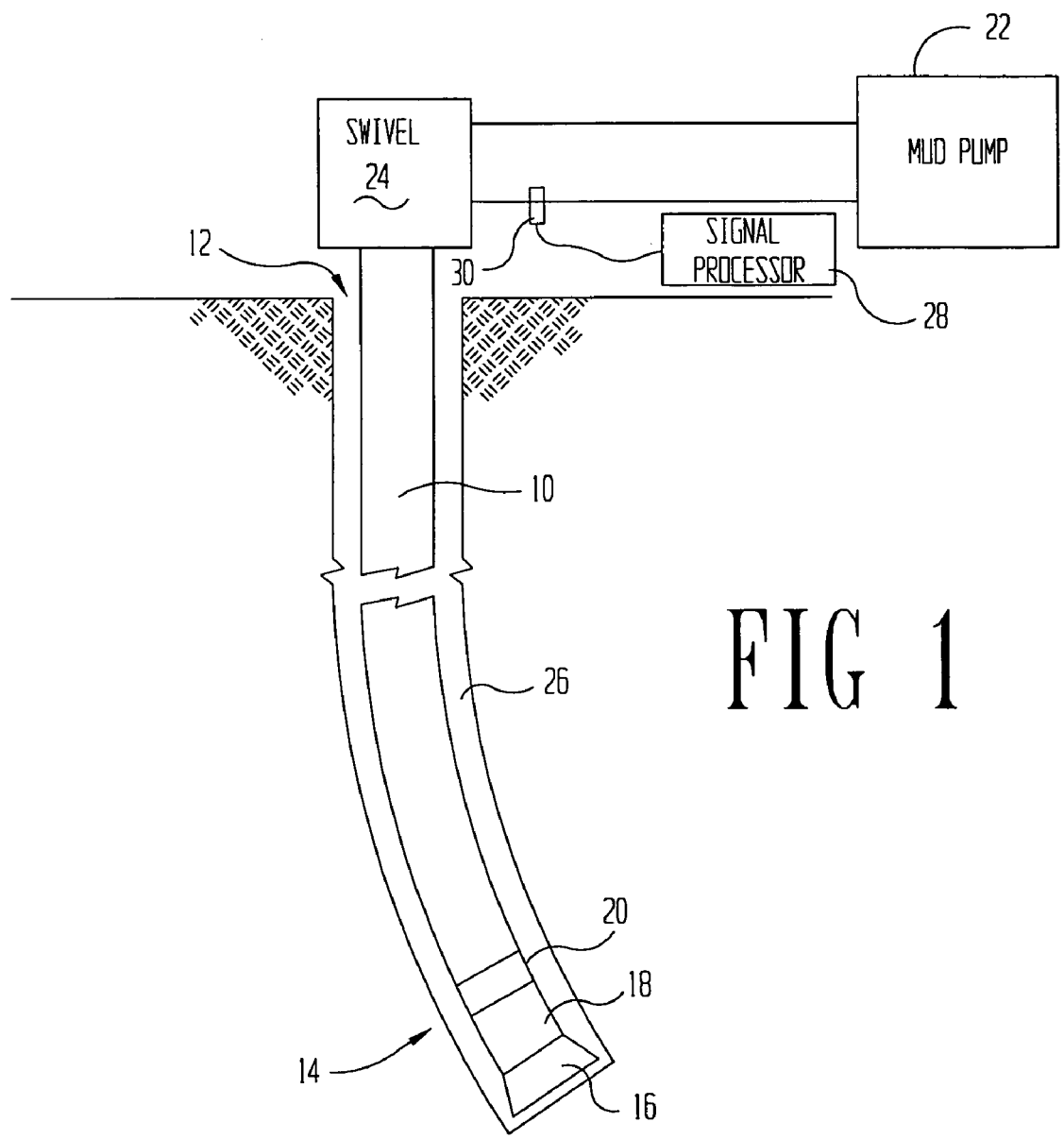
FIG. 1 shows a drilling system in accordance with embodiments of the invention.

FIG. 1 shows an embodiment of a drilling system having a drill string 10 disposed within a borehole 12. The drill string 10 has at its lower end a bottomhole assembly 14 which may comprise a drill bit 16, downhole measuring and/or logging devices 18, and a transmitter or pulser in a mud pulse communication system 20. The downhole sensors 18 may comprise any now existing or after-developed logging-while-drilling (LWD) or measuring-while-drilling (MWD) devices or tools. The bottomhole assembly 14 may also comprise systems to facilitate deviated drilling such as a mud motor with bent housing, rotary steerable systems, and the like. Moreover, the lower end of the drill string 10 may also comprise drill collars (not specifically shown) to assist in maintaining the weight on the bit 16. Drill string 10 is preferably fluidly coupled to the mud pump 22 through a swivel 24. The swivel 24 allows the drilling fluid to be pumped into the drill string, even when the drill string is rotating as part of the drilling process. After passing through bit 16, or possibly bypassing bit 16 through pulser 20, the drilling fluid returns to the surface through the annulus 26. In alternative embodiments, the bottomhole assembly 14 may mechanically and fluidly couple to the surface by way of coiled tubing; however, the methods of compressing information for transmission described in this patent may remain unchanged.

Figure 2:
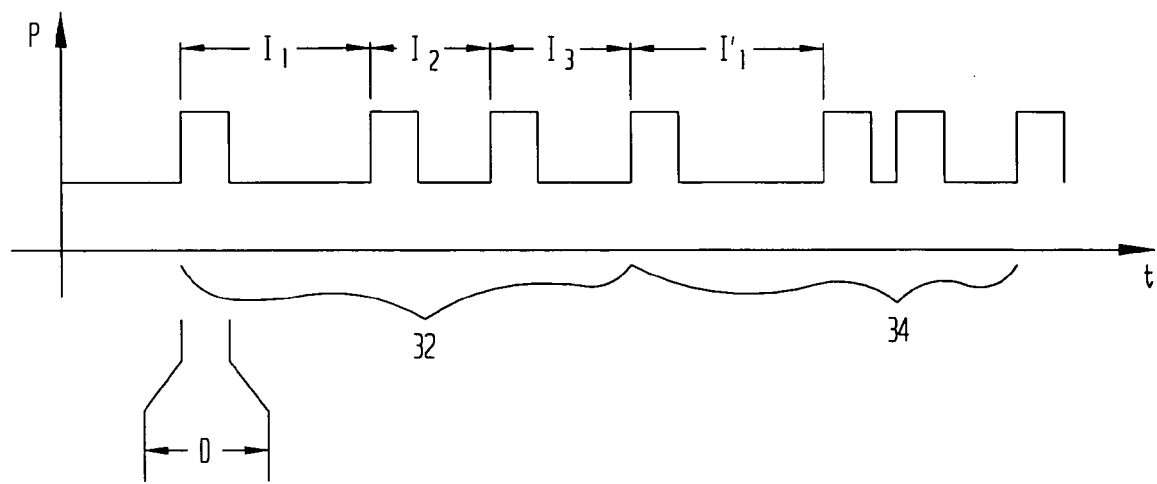
FIG. 2 shows a graph of ideal pressure pulses in drilling fluid.

Embodiments of the invention may transmit data gathered by downhole tools to the surface by inducing pressure pulses into the drilling fluid—mud pulse telemetry. In particular, the drill string 10 may comprise mud pulse communication system 20 that couples within the drill string, and also couples to the measuring and/or logging devices 18. The mud pulse communication system may thus gather data from the devices 18, and transmit the data to the surface by creating mud pulses in the drilling fluid within the drill string. FIG. 2 shows an exemplary graph of drilling fluid pressure as a function of time, which may be measured by the signal processor 28 coupled to the pressure sensing device 30 (FIG. 1). The exemplary graph of FIG. 2 represents an ideal situation where ideal square wave pulses are generated downhole, and are detected as ideal square waves at the surface. In actual systems, this may not be the case. However, FIG. 2 may help identify terminology related to the various embodiments. In particular, FIG. 2 illustrates that a "list" may comprise a plurality of "intervals," e.g. list 32 comprising three intervals $I_1$, $I_2$ and $I_3$. An interval may be the time duration between the leading (or alternatively trailing) edges of pulses.

Figure 3:
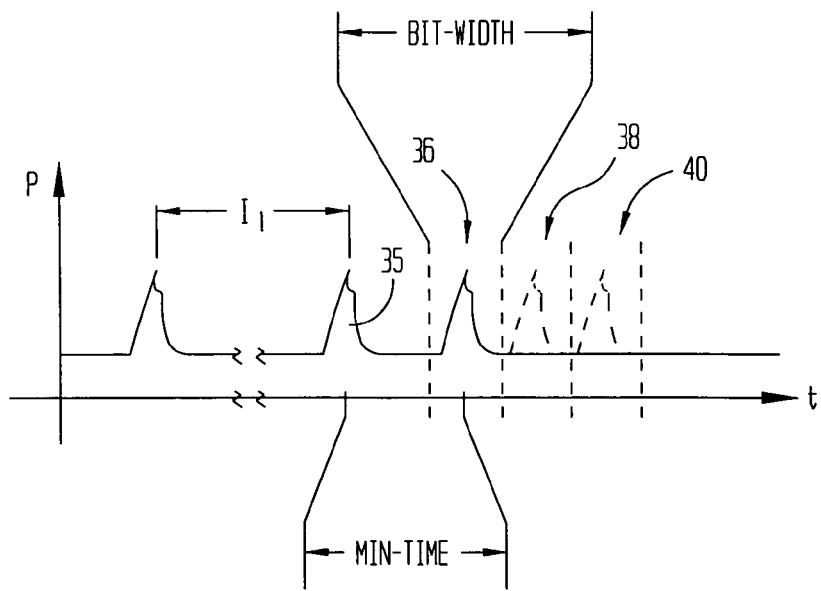
FIG. 3 shows a more realistic graph of pressure pulses in drilling fluid in accordance with embodiments of the invention.

FIG. 3 shows a more realistic graph of pressure pulses, as may be detected by pressure sensor 30 and signal processor 28 at the surface. Rather than being the ideal square wave pulses as depicted in FIG. 2, these pulses may be dampened, may have their frequency components dispersed, and the like. FIG. 3 may also help exemplify several parameters of a pulse position modulation system. Interval $I_1$ is shown to have a particular time length or duration. The duration of the interval $I_1$ is preferably longer than a maximum interval length of the remaining intervals in each list so that the start of the new list may be identified. In alternative embodiments, a long interval may reside at the end of the list. For each remaining interval, such as $I_2$ and $I_3$ (whether data encoded is a list identification number or actual data gathered by downhole sensors 18), there is a minimum time (MIN-TIME) for the interval. An interval having a length substantially equal to the MIN-TIME encodes a data value of zero. FIG. 3 exemplifies, in the second interval, two pulses having a MIN-TIME duration and that may represent a data value zero. The MIN-TIME may range from between approximately 0.3 seconds and 2.0 seconds for most drilling systems, with a MIN-TIME of 0.6 seconds preferred. The MIN-TIME duration may need to be greater than approximately three times a pulse duration ("D" of FIG. 2), where the pulse duration is the time duration of a pulse event. A pulse event may be either a positive pulse or a negative pulse created by transmitter 20.

FIG. 3 also exemplifies that the interval duration need not necessarily be precise to represent a value. Instead, the embodiments of the invention may utilize a window in which a pulse of an interval may fall, yet still represent the same value. For the second interval of FIG. 3, the second pulse 36 may fall within the BIT-WIDTH window. So long as a pulse falls within its BIT-WIDTH window, the data value encoded may still be the same. In the particular example of pulse 36, the interval may represent a data value of zero. The BIT-WIDTH window, however, is applicable to each received pulse in the pulse train. For example, the pulse 38 drawn in dashed lines falls within the next BIT-WIDTH window, and therefore the time duration between pulse 35 and pulse 38 may represent a data value of one. Likewise, the pulse 40 falls within the third BIT-WIDTH window, and therefore the time duration between pulse 35 and pulse 40 may represent a data value of two. In more general terms, the value encoded in the pulse position modulation system may be decoded using substantially the following equation:

$$\text{DATA} = (\text{INTERVAL} - \text{MIN-TIME})/\text{BIT-WIDTH} \quad (1)$$

Wherein DATA is the decoded value, INTERVAL is the measured time of the interval, and MIN-TIME and BIT-WIDTH are as described above. Given existing technology, BIT-WIDTH values may range from approximately 0.03 seconds to 0.12 seconds; however, a BIT-WIDTH value of 0.04 seconds is preferred. For a particular number of bits encoded within each interval, there is a maximum time (MAX-TIME) length or duration. For example, if a particular interval encodes a four-bit number (which could therefore range in value from zero to fifteen), the four-bit number at its maximum value forces an interval duration equal to its MAX-TIME. Co-pending application Ser. No. 10/305,529 titled "Data Recovery for Pulse Telemetry Using Pulse Position Modulation," and application Ser. No. 10/306,487 titled "Structure and Method for Pulse Telemetry," both of which are incorporated by reference herein as if reproduced in full below, describe methods and systems for mud pulse telemetry, including error detection and correction, that may be utilized in various embodiments of the invention.

Embodiments of the invention group intervals into lists. For example, list 32 and list 34 in FIG. 2 each comprise three intervals. Each list may comprise values of detected downhole parameters such as, without limitation, uncompressed electromagnetic wave resistivity (an eight-bit value encoded in two intervals), an uncompressed gamma ray reading (an eight-bit value encoded in two intervals), and an uncompressed density value (a twelve bit value encoded in three intervals). Multiple lists may be created. The following table exemplifies the components of a group of intervals forming an uncompressed list in accordance with embodiments of the invention.

TABLE 1

| Interval | Bit Number | | | | | | | |
| --- | --- | --- | --- | --- | --- | --- | --- | --- |
| | 7 | 6 | 5 | 4 | 3 | 2 | 1 | 0 |
| 1 | PAD 2 | PAD 1 | PAD 0 | P 4 | P 3 | P 2 | P 1 | P 0 |
| 2 | 0 | 0 | 0 | 0 | ID 3 | ID 2 | ID 1 | ID 0 |
| 3 | 0 | 0 | 0 | 0 | A 7 | A 5 | A 3 | A 1 |
| 4 | 0 | 0 | 0 | 0 | A 6 | A 4 | A 2 | A 0 |
| 5 | 0 | 0 | 0 | 0 | B 7 | B 5 | B 3 | B 1 |

TABLE 1-continued

| | Bit Number | | | | | | | |
|---|---|---|---|---|---|---|---|---|
| Interval | 7 | 6 | 5 | 4 | 3 | 2 | 1 | 0 |
| 6 | 0 | 0 | 0 | 0 | B 6 | B 4 | B 2 | B 0 |
| 7 | 0 | 0 | 0 | 0 | C 3 | C 2 | C 1 | C 0 |
| 8 | 0 | 0 | 0 | 0 | C 7 | C 6 | C 5 | C 4 |
| 9 | 0 | 0 | 0 | 0 | C 11 | C 10 | C 9 | C 8 |

In Table 1 (PAD 2 . . . PAD 0) are pad bits in the long interval that may be selectively set to ensure the long interval is longer than MAX-TIME of the remaining intervals, and thus identifies the start of a new list, (P4 . . . P0) are parity bits calculated using the encoded data contained in the list, (ID3 . . . ID0) are identification bits which identify the list, and therefore the data values in the list, (A7 . . . A0) are bits of an exemplary eight bit uncompressed downhole parameter, (B7 . . . B0) are bits of an exemplary eight bit uncompressed downhole parameter, and (C11 . . . C0) are the bits of an exemplary twelve bit uncompressed downhole parameter. Table 1 exemplifies that in the preferred embodiments, except for the initial interval, the intervals in a list have encoded therein a number of bits that is less than the number of parity bits, and may be the same for each interval. The number of bits in each data interval may be selected to increase efficiency of the transmission time given a particular BIT-WIDTH and MIN-TIME. For most applications, identification and data intervals using four bit encoding are preferred. Table 1 shows only the transfer of three pieces of uncompressed data (two eight bit parameters and a twelve bit parameter); however, any number of related or unrelated parameters may be transferred within any one list.

Because of the speed at which downhole devices traverse the formations in MWD and LWD systems, formation and/or borehole parameter values may not rapidly change between readings taken by downhole devices. Based on this fact, and possibly in order to increase an effective data transmission rate in a mud pulse telemetry system, various embodiments of the invention may utilize a data compression method when transmitting the data uphole. By compressing the data prior to its transmission, it may be possible to reduce the overall number of bits of information which need to be sent to the surface relative to the same amount of uncompressed data, thus increasing effective data rate.

While there may be many possible data compression methods that may be utilized, the preferred embodiments use a Delta value compression system on data. Consider for purposes of explanation, and with reference to Table 1 above, three exemplary types of telemetry data A, B and C. As illustrated in Table 1, data type A may be an eight-bit parameter, data type B may likewise be an eight-bit parameter, and data type C may be a twelve-bit parameter. In the related art, each of these parameters A, B and C may be transmitted to the surface in full, uncompressed format, regardless of the amount of change (if any) in value between the previous transmission and the current transmission. The various embodiments of the present invention, however, on at least some occasions encode a compressed version of each of the data types for transmission. For example, if parameter A has experienced no change in value from the value that was previously transmitted to the surface, then in the preferred embodiments only a data value of zero may be sent (rather than encoding again the entire eight bit value). Likewise, if the parameter A experiences only a small change in value from the value previously sent, a number representing the change in value may be transmitted to the surface. This change in value, or Delta value, may require fewer bits; therefore, the overall number of bits to transfer the information is reduced, increasing the effective data throughput. An example using real numbers may be helpful in understanding the Delta value concept.

Consider for purposes of explanation only, a downhole tool having an eight bit parameter with the following sequence of data to be transmitted to the surface: 110, 112, 115, 111 and 107. In one embodiment, the first datum or value transmitted may be in its uncompressed, eight bit format. For some number of intervals thereafter, only the changes in value from the uncompressed datum may be sent. In this example, the values transmitted may be: 110, +2, +5, +1, and −3. In embodiments of the invention, the compressed values may be related to the immediately prior value, whether compressed or uncompressed. Thus, in these embodiments, the transmitted values for the number sequence above may be: 110, +2, +3, −4, and −4.

In more mathematical terms, Delta values may relate back to the previous uncompressed value according to the following equation:

$$\Delta A[n]=A[n]-A[m] \quad (1)$$

where A is the downhole parameter of interest, $\Delta A$ is the change in value of parameter A, n is the index to the current datum, and m is the index to the last uncompressed datum transmitted. Likewise with respect to the embodiments where Delta values relate to the immediately previously sent value, the Delta values may relate to each other according to the following equation:

$$\Delta A[n]=A[n]-A[n-1] \quad (2)$$

Selecting one of the compression methods of equations (1) or (2) above may be based on the bit error rate of the particular system. A bit error rate may be a relationship between a number of bits transmitted to the surface, and a number of bits correctly received and decoded by surface equipment. In mud pulse telemetry systems where the bit error rate is relatively low (a system experiencing low corruption of data in the transmission process) for example, having Delta values relate back to the immediately previous value (equation (2)) may be utilized. The Delta modulation of equation (2) may be used with low telemetry bit error rates because a bit error that corrupts a set of data (a bit error that is not correctable) may cause all values thereafter to not be usable. By contrast, the Delta modulation method that relates the Delta value back to the last uncompressed value (equation (1)) may be more desirable in situations where bit error rates are high. In this system, loss of any particular Delta value does not affect the calculation of actual values based on subsequently transmitted Delta values.

The number of bits used to encode Delta values may be based on the relative size of the Delta values as well as the number of bits encoded in each interval. In at least some of embodiments of the invention, the compressed values transmitted to the surface may be encoded using a number of bits related to the number of bits in the intervals in the list. As exemplified in Table 1, each of the intervals after the long interval may encode four bit values. With the preferred short or data interval width of four bits, the Delta value for an eight-bit value may be encoded within a single interval, comprising four bits. Likewise, the Delta value for a twelve bit parameter may be encoded in either four bits (one interval), or eight bits (two intervals).

Using exemplary parameters A, B and C from Table 1 above, the Delta value companion list to the list of Table 1 may read as follows:

TABLE 2

| Interval | Bit Number | | | | | | | |
|---|---|---|---|---|---|---|---|---|
| | 7 | 6 | 5 | 4 | 3 | 2 | 1 | 0 |
| 1 | PAD 2 | PAD 1 | PAD 0 | P 4 | P 3 | P 2 | P 1 | P 0 |
| 2 | 0 | 0 | 0 | 0 | ID'3 | ID'2 | ID'1 | ID'0 |
| 3 | 0 | 0 | 0 | 0 | ΔA 3 | ΔA 2 | ΔA 1 | ΔA 0 |
| 4 | 0 | 0 | 0 | 0 | ΔB 3 | ΔB 2 | ΔB 1 | ΔB 0 |
| 5 | 0 | 0 | 0 | 0 | ΔC 3 | ΔC 2 | ΔC 1 | ΔC 0 |
| 6 | 0 | 0 | 0 | 0 | ΔC 7 | ΔC 6 | ΔC 5 | ΔC 4 |

Where ID' may identify the companion list to an uncompressed list. Thus, rather than encoding the uncompressed values of each of the parameters A, B and C as exemplified in Table 1, Table 2 shows that the overall list may comprise Delta values for each of the parameters A, B and C. With Delta values encoded as four-bit numbers for each of the parameters, the list may be shortened from nine total intervals (Table 1) to only six intervals. A surface computer, such as signal processor 28 of FIG. 1, may calculate actual values of the exemplary three parameters by the decoding the information using one of either the previous uncompressed list or the previous compressed list, depending upon the compression method.

At least some of the parameters sent from the downhole devices to the surface are in a compressed, preferably Delta modulated, format. One possible encoding mechanism is to directly encode the Delta values within the interval. For example, if the Delta value is +1, and the interval width is four bits, it would be possible to encode a binary [0001] to indicate the +1 Delta value. Likewise, if the Delta value is +2, one possible implementation would be to encode the value [0010] in the interval. As for negative values, for example −2, the leading bit in the interval could be set to indicate a negative value, such that −2 may be encoded as [1010], or alternatively a 1's-compliment may be used and therefore encoding of value [1101]. While each of these encoding methods, as well as others, may be operational, the preferred embodiments utilize an encoding method for the Delta values that may, on average, shorten the compressed data interval length, and therefore further decrease transmission time.

If the Delta values for a particular downhole parameter are tracked on a statistical basis, a probability of any particular Delta value occurring may take a normal distribution centered at zero. In other words, the most likely Delta value for a downhole parameter may be zero. The next most likely Delta values for a downhole parameter may be small positive and negative values near zero, for example, +1 and −1, and the like. A Delta value of zero may be encoded within an interval as a zero value, thus the interval will have only a MIN-TIME duration. With regard to the remaining possible Delta values, the preferred embodiments may utilize a method called "entropy encoding." In entropy encoding, the most likely or most probable Delta values, regardless of their actual value, are assigned smaller binary values, and therefore the shorter transmission times in a pulse position modulation system. Table 3 below shows an exemplary assignment of integer Delta values and their corresponding bit patterns within each interval.

TABLE 3

| Δ Value | Encoded Value |
|---|---|
| 0 | 0000 |
| +1 | 0001 |
| −1 | 0010 |
| +2 | 0011 |
| −2 | 0100 |
| +3 | 0101 |
| −3 | 0110 |
| +4 | 0111 |
| −4 | 1000 |
| +5 | 1001 |
| −5 | 1010 |
| +6 | 1011 |
| −6 | 1100 |
| +7 | 1101 |
| −7 | 1110 |
| +8 | 1111 |

As exemplified in Table 3, the most probable Delta value may have an encoded value of zero. The second most likely Delta values may have encoded values of binary [0001] (for +1) and binary [0010] (for −1) respectively—values having only one and two bit widths respectively longer pulse time than the MIN-TIME. Although Table 2 shows integer Delta values, one of ordinary skill in the art, now understanding the entropy encoding technique to reduce transmission time, could easily assign or encode other Delta values to the encoding scheme. For example, a bulk density reading may span 1.2 to 3.2 grams per cubic centimeter in normal logging operations. Because of the resolution of the downhole device, the Delta values may be 0.0, +0.02, −0.02, +0.04, −0.04, and so on. Using the entropy encoding techniques, the +0.02 Delta value may be assigned an encoded value of binary [0001]. Likewise, the Delta value of −0.02 may be assigned an encoded value of binary [0010], and the like.

Embodiments of the invention may use many compression ratios depending on the bit error rate of the system: 1:1 compression (one compressed list for each uncompressed list), a 1:2 compression (two compressed lists for each uncompressed list), and so on. In mud pulse telemetry systems having high bit error rates, where many intervals have errors that are uncorrectable, 1:1 compression may be the most advantageous. In yet other systems where the bit error rate is relatively low, higher compression rates 1:M (where M is the number of compressed lists for each uncompressed list) may be used. In operation, the downhole device may send an uncompressed list of parameters, and thereafter send a series of compressed lists up to the predetermined M. After M compressed lists have been sent, the downhole system may again send an uncompressed list. The downhole system need not, however, stringently follow the desired compression rate.

The various embodiments of the invention may also have the capability to refrain from sending a compressed list when any one of the Delta values exceeds a number that may be encoded in the number of bits in a compressed interval. In this circumstance, the downhole device may send an uncompressed version of the parameters, and then attempt in the next interval to send compressed values. Thus, if 1:3 compression is being utilized in an exemplary system, and a Delta value for one of the parameters in what should be the second compressed list exceeds that which may be encoded in a compressed interval, the downhole device reverts to sending an uncompressed list, and resets a counter so that the subsequent three intervals may be sent in compressed format (Delta values allowing). Even if only a 1:1 compression ratio is used, however, the effective transmission rate may still increase.

Figure 4:
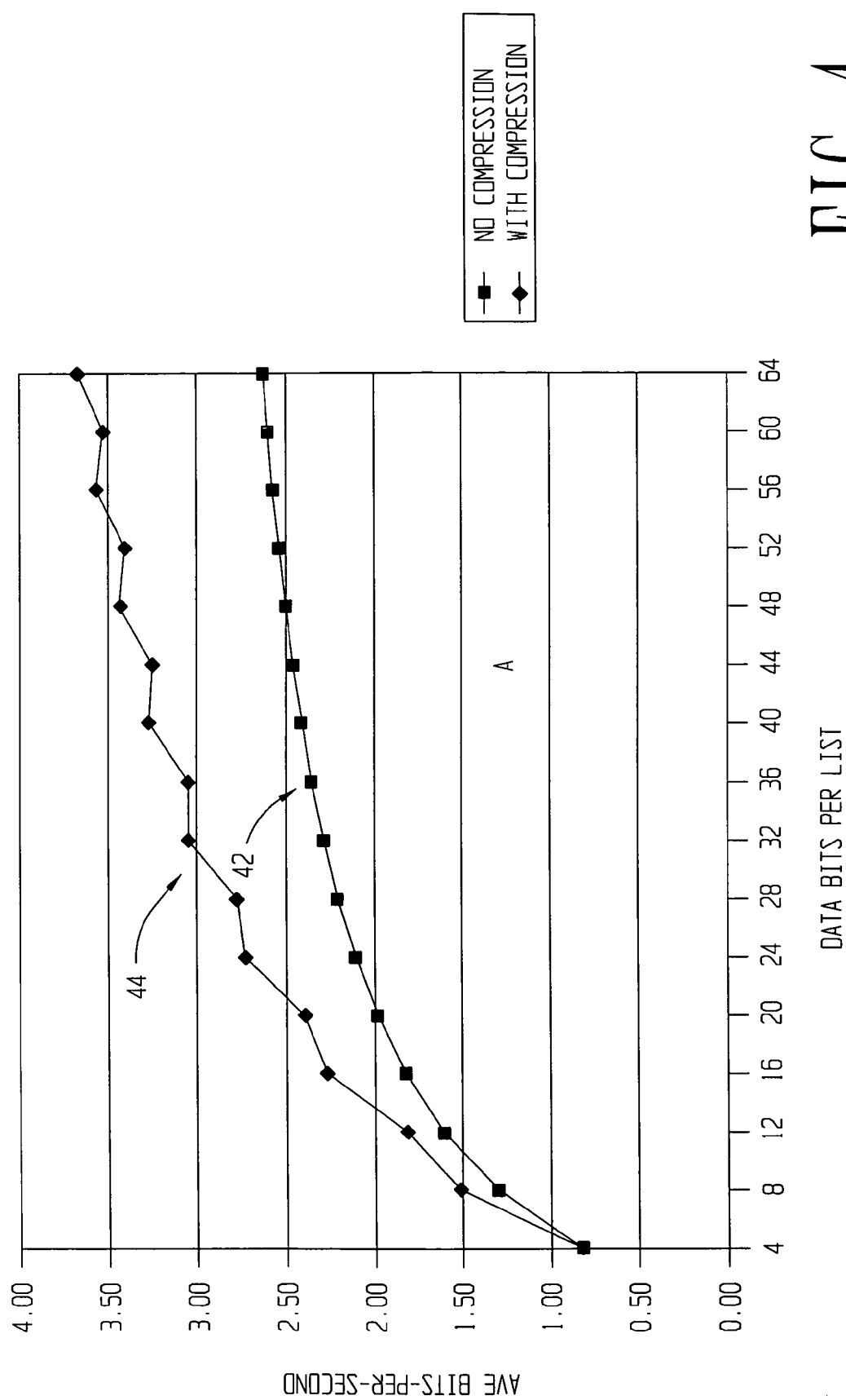
FIG. 4 shows a graph of average bits per second versus data bits in a list with no compression, and with 1:1 compression.

In the non-limiting case of an uncompressed list comprising two eight bit parameters and one twelve bit parameter, a total of forty bits of information (including pad bits, parity bits and list identification bits) may be sent. If those same three parameters have their Delta values sent rather than their uncompressed values, and each Delta value for the eight-bit parameters may span only four bits and each Delta value for the twelve bit parameter may span only eight bits (as exemplified in Table 2), it is possible that only twenty-eight total bits may be needed to transmit the Delta values to the surface. FIG. 4 shows the average number of bits per second transmitted in the system as a function of the total number of data bits in each list. The first series 42 shows the average number of bits per second with no compression (each list sent in uncompressed format). The second series 44 exemplifies the effective number of bits per second that may be seen in the system utilizing a 1:1 compression. As is exemplified in FIG. 4, even a 1:1 compression may result in statistically significant increases in the effective bits per second transmitted.

As described in Table 1 above, each list may have a list identification number comprising, in at least some embodiments, four bits. Because of this number of bits, the list identification number may thus take on sixteen possible states. In order to identify uncompressed lists and their companion compressed lists, embodiments of the invention determine, possibly prior to deployment of the downhole device, the list identification numbers of the uncompressed lists, as well as their companion compressed lists. Using Tables (1) and (2) as an example, Table (1) may be an uncompressed list having a list identification ID. Table (2) may be a companion (compressed) list having list identification ID'. For example, and without limitation, a first uncompressed list may be assigned a list identification number of zero, and its companion compressed list may be assigned binary [1111].

The various embodiments described to this point have assumed multiple parameters contained in each list, and that each parameter may likewise have a corresponding compressed version that may be sent in a compressed list. Given the speed at which information may be transmitted in a mud column, it may be possible that multiple downhole parameters may be sampled or determined in the amount of time that it takes one set of information to be transmitted to the surface. In other words, downlole tools may calculate borehole and formation parameters faster than a list may be telemetered to the surface in uncompressed form. Although surface equipment may be receiving "real time" data, the surface may only be receiving every other or every third datum. In alternative embodiments, it is not necessary that each list contain different parameters, and instead each list may contain multiple readings of the same parameter. The compression technology discussed in this specification may, therefore, be used to increase the volume of data for intervals comprising data for a single parameter sent to the surface. For example, a list comprising nine intervals may be modified such that it contains one uncompressed value, and then a plurality of compressed or Delta values based, either directly or indirectly, on the uncompressed value. A plurality of subsequent lists may contain only compressed values, for example. The number of subsequent lists containing compressed values is related to the particular compression ratio used for the system. In this way, surface equipment may be able to receive all the data generated downhole for particular parameters.

Relatedly, in some embodiments, the data compression may allow interleaving such that if any one list is corrupted and uncorrectable, the surface system may still have data spanning that period of time. More particularly, a first list may send values of parameter A of A[N], ΔA[N+2], ΔA[N+4] and the like. A subsequent list may thus carry datums of the A parameter of A[N+1], ΔA[N+3], ΔA[N+5] and the like. If either the first list or the second list has an uncorrectable bit error, the surface system still has valid data from that period of time. It is noted that in this example each list contained an uncompressed datum and a plurality of compressed datums; however, a subsequent list need not have the uncompressed values as discussed above. As an alternative to this interleaving, subsequent lists may overlap data so that should any one list experience an uncorrectable bit error, the data spanning the time period may be reconstructed from the immediately prior and subsequent lists. For example, consider four lists having the following data: List 1—A[N], A[N+1], A[N+2], A[N+3]; List 2—A[N+1], A[N+2], A[N+3], A[N+4]; List 3—A[N+3], A[N+4], A[N+5], A[N+6]; List 4—A[N+4], A[N+5], A[N+6], A[N+7]. Thus, should either of lists 2 or 3 have uncorrectable bit errors, no data will be lost.

Other methods may be used to reduce data loss given uncorrectable bit errors in transmission. Consider a series of three lists: a first list having an uncompressed value (and possibly compressed values); a second list having compressed values relating back to the uncompressed value in the first list; and a third list having an uncompressed value. If there is no correlation between the second and third list, an uncorrectable bit error in the first list renders the first and second list unusable. However, in at least some embodiments, one of the compressed values of the second list may correlate to the uncompressed value in the third list. For example, the last compressed value may be the same value as will be sent as the uncompressed in the third list. In this way, should the first list be lost to uncorrectable bit errors, the second list may still be used by back-calculating the values using the uncompressed value from the third list.

In embodiments of the invention where surface equipment receives real-time data of a plurality of different parameters in each list, time tagging of data, possibly for correlating the data to depth, may take place at the surface. That is, surface equipment, such as a processor, may note the time the data was received, then back-calculate when the down hole samples were taken by accounting for travel time of the pulses within the mud column and signal processing latencies in the down hole equipment. In embodiments of the invention where each list contains a plurality of values of the same down hole parameter, the sample time calculated at the surface may not be applicable to each value in the list, as these values may not have been simultaneously determined. In cases such as this, at least some embodiments of the invention order the data in the lists such that the last datum corresponds to the last sample taken. The time calculated by surface equipment, again possibly taking into account travel time of the mud pulses in the mud column and down hole processing latencies, may thus be associated with the last datum, and time tags for remaining values in the list may be calculated by knowing the periodicity at which samples of the parameter of interest are taken down hole.

In alternative embodiments of the invention, down hole samples may have been taken many minutes or hours from when they are transmitted to the surface, and thus may be referred to as "historical data." Time tagging data values of the same parameter in a list in these embodiments may involve sending a list containing a start time or time tag for a first datum. The list containing start time may be sent a plurality of times to ensure that the surface equipment receives the information. Thereafter, a plurality of lists may be sent to the surface, each list comprising data of the parameter. Each list may additionally comprise a counter value that identifies each of the samples in the list in relation to the first datum (possibly in a previous list). Surface equipment, knowing the start time of the data, the periodicity of the samples, and a sample number for each datum, may thus calculate a time tag for each datum. While sending the start time or time tag for the first datum prior to sending the remaining is preferred, the list containing the time tag may be sent before, during or after the bulk of the data. Further, while sending the lists with data in sample order may be preferred, the lists may be sent in any order given that the counter value may identify a sample number of each datum in the list without reference to counter values from other lists.

Although not necessarily required, the preferred embodiments of the present invention implement a smoothing function on the downhole data prior to its transmission to the surface. The inventors of the present specification have found that smoothing does not unduly affect the accuracy of the downhole parameters, and further the smoothing aids in removing noise from the downhole parameters that may cause an unnecessarily large number of, or unnecessarily large, Delta values for any particular parameter. Although many smoothing functions may be utilized, e.g. averaging over a time window, averaging over N number of points, in the preferred embodiments, "exponential smoothing" is utilized using substantially the following equation.

$$y_i = \frac{x_i + (\alpha * y_{i-1})}{1 + \alpha} \quad (3)$$

where y is the smoothed datum of a particular index i, x is the raw datum of a particular index and $\alpha$ is a smoothing coefficient that varies with the resolution of the tool and the rate of penetration. Any value above zero may be used, with $\alpha$ of 0.5 being preferred.

The above discussion is meant to be illustrative of the principles and various embodiments of the present invention. Numerous variations and modifications will become apparent to those skilled in the art once the above disclosure is fully appreciated. For example, it is possible that compressed data and unrelated uncompressed data may be contained within the same list. A primary list may have uncompressed values, and a companion list may have compressed values for some of the parameters, but also contain one or more uncompressed values. Further, the specification has discussed that compressed values should be encoded using four bits; however, any number of bits may be used for the Delta values without departing from the scope and spirit of the invention. Moreover, it may be possible that an interval of a list may contain multiple compressed values, for example, two, two-bit Delta values may be encoded together in a four-bit interval. Further still, it is contemplated that downhole system or systems may be capable of switching between Delta values having varying resolutions. Thus, in the case of Delta values for a single parameter contained within an interval, the downhole system may use Delta values having two bits when the size of the Delta values so allows, and the downhole device may switch to Delta values encoded using four bits if the Delta values so require. The resolution of use may be identified by the companion list ID number. Though the specification has described the compression in the context of mud pulses, the compression techniques described may find application in any form of MWD and LWD communications, such as electromagnetic and acoustic. Furthermore, combinations of technologies may be used, e.g. mud pulse and electromagnetic could be used at the same time. The data compression could be used across all channels, or merely subsets of the channels. The communication systems described are equally applicable to communication from surface devices to downhole devices. It is intended that the following claims be interpreted to embrace all such variations and modifications.

What is claimed is:

1. A method comprising:
   sending a list from a downhole device in a drill string to a surface, the list comprising a plurality of samples of a parameter in compressed form; and
   calculating a time tag for each of the plurality of samples in the list by:
      calculating a time tag for a most recent sample of the plurality of samples; and
      calculating a time tag for remaining samples based on the time tag for the most recent sample and a period at which samples are taken.

2. The method as defined in claim 1 wherein calculating a time tag for a most recent sample further comprises calculating a time tag for a last sample in the list.

3. A method comprising:
   sending a first list comprising a time tag for a datum of a plurality of datums of historical data; and
   sending a second list comprising a plurality of datums from sequential samples, and a counter value indicative of a relationship of the plurality of datums in the second list to the datum having the time tag of the first list.

4. The method as defined in claim 3 further comprising determining a time tag for each of the plurality of datums in the second list based on the time tag of the first list, the count value, and a time period between sampling that creates each datum.

5. The method as defined in claim 3 wherein sending the first list precede sending the second list.

* * * * *